(12) United States Patent
Vaaraniemi et al.

(10) Patent No.: US 7,798,949 B2
(45) Date of Patent: Sep. 21, 2010

(54) SPREADER ROLL

(75) Inventors: Kalle Vaaraniemi, Jyväskylä (FI); Juha Isometsä, Jyväskylä (FI)

(73) Assignee: Metso Paper, Inc., Helsinki (FI)

( * ) Notice: Subject to any disclaimer, the term of this patent is extended or adjusted under 35 U.S.C. 154(b) by 1058 days.

(21) Appl. No.: 11/468,098

(22) Filed: Aug. 29, 2006

(65) Prior Publication Data

US 2007/0117699 A1    May 24, 2007

(30) Foreign Application Priority Data

Sep. 1, 2005    (FI)    ................... 20055465

(51) Int. Cl.
    *B25F 5/02*    (2006.01)
(52) U.S. Cl. ...................... 492/39
(58) Field of Classification Search ........... 492/39, 492/16, 20, 28, 36, 45, 60, 40
    See application file for complete search history.

(56) References Cited

U.S. PATENT DOCUMENTS

| | | | |
|---|---|---|---|
| 4,478,058 A * | 10/1984 | Kazmaier et al. | 66/149 R |
| 4,592,214 A * | 6/1986 | Goller et al. | 66/149 R |
| 4,777,808 A * | 10/1988 | Kuhnert | 66/149 R |
| 5,425,251 A | 6/1995 | Schmid et al. | |
| 5,960,646 A | 10/1999 | Schmid et al. | |
| 6,042,525 A | 3/2000 | Rajaniemi | |
| 6,592,503 B2 | 7/2003 | Isometsä et al. | |
| 6,723,032 B2 | 4/2004 | Eronen | |

FOREIGN PATENT DOCUMENTS

| | | |
|---|---|---|
| DE | 2912990 A1 | 10/1980 |
| FI | 98906 B | 5/1997 |
| FI | 103827 B | 9/1999 |
| FI | 106277 B | 12/2000 |
| FI | 106741 B | 3/2001 |
| SU | 467806 | 5/1975 |

OTHER PUBLICATIONS

Search Report issued in Finnish priority App. No. 20055465.
English translation of Abstract in FI Pat. No. 106741 B.
English translation of Abstract in FI App. No. 932060 (FI Pat. No. 98906 B).

* cited by examiner

*Primary Examiner*—John C Hong
(74) *Attorney, Agent, or Firm*—Stiennon & Stiennon

(57) ABSTRACT

A spreader roll has at least two partial rolls (10, 20, 30) with a composite shell (11, 21, 31) and two end part rolls (10, 30) connected together directly or by an intermediate part roll (20) so a gap (D) remains between the end surfaces of the shells (11, 21, 31) of the partial rolls (10, 20, 30). An end journal (12, 32) is connected to the outer end of the roll shell (11, 31) of each end part roll (10, 30). Each end journal is supported to frame constructions (R) by an end bearing (40, 50). The partial rolls (10, 20, 30) are connected by an intermediate journal (13, 33) rotating with the roll shells (11, 21, 31) of the partial rolls (10, 20, 30). The intermediate journal (13, 33) is supported to a fixed support beam (P) external to the spreader roll by an intermediate bearing (60, 70).

15 Claims, 3 Drawing Sheets

SPREADER ROLL

CROSS REFERENCES TO RELATED APPLICATIONS

This application claims priority on Finnish Application No. 20055465, filed Sep. 1, 2005, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

This invention relates to spreader rolls.

In the spreader roll according to the invention a shell made of composite material is used. Due to the advantageous material properties of the composite roll, such as the elastic modulus and density, the composite roll can be dimensioned in such a way that it is bendable to a desired curvature using moderate torque and that it operates either at a subcritical speed, i.e. below the lowest resonance frequency, or between the resonance frequencies. If it is desired to bend a steel roll to the required curvature without the stresses growing excessive, the roll diameter must be very small. In this case exceeding one or more of the roll's critical speeds is unavoidable.

Additionally, for a steel roll the bending moment required by bending is notably higher than for a composite roll, in which case the bearing forces of the steel roll are also notably higher than those of the composite roll.

FI patent 106741 proposes one bendable-material roll for a web-like material. The roll comprises a continuous tube like roll shell made of composite material and journals attached to both ends of the roll shell and rotating with the roll shell. The journals are supported at least with two bearing elements, placed at a distance of each other in the axial direction of the roll, to a support element surrounding the journal, which in turn is supported to the machine frames. The first bearing element is supported to the support element via a bending mechanism, which directs a force affecting in the radial direction to the first bearing element for deviating the first bearing element relative to the center axis of the non-bent roll, whereupon the journal bends relative to the fulcrum created at the second bearing element, and a bending moment is directed to the roll shell. Using such a solution the roll shell can be made to bend to a uniform curvature. However, the solution is not very well suitable for the press section, in which the forces directed to the spreader roll are high.

FI patent 106277 proposes a sectional roll, which comprises several successively located roll components, of which each is mounted with bearings to rotate supported by a support shaft of its own. Arranged on both axial end surfaces of the support shaft of the roll components there are connection elements, such as e.g. a projection and a corresponding recess, by means of which the two successive roll components can be connected to each other in a disconnectable way. The support shaft is composed of at least two parts, the mutual position of which can be changed to modify the axial length of the support shaft to such an extent that the connecting elements on the end surfaces of the two successive sectional rolls contact each other or disengage from the coupling. This enables the replacement of an individual roll component at the center of the sectional roll without the need for dismantling the entire roll assembly. Each roll component is made of two nested cylindrical sleeves, which are connected together by a neck placed symmetrically at their midpoint. The outer cylinder forms the shell of the roll component and the inner cylinder is shorter than the outer cylinder. The inner cylinder is mounted with two bearings by its outer surface to the non-rotating support shaft of the roll component. The support shaft is composed of two flange-like parts, which are connected together by a pin extending through the inner cylinder. The cylinders are rotating while the support shaft is fixed. The other part of the support shaft is supported at its end to a support beam external to the roll component. This support can be adjustable in which case it is possible to adjust the position of an individual roll component relative to the adjacent roll components. Such an arrangement provides the adjustment of the sectional roll curvature. The curvature of a sectional roll is created by the fact that the center axes of the individual roll components are not aligned. The shells of the individual roll components, however, are parallel, whereupon the curvature of the sectional roll forms a fraction line. A sectional roll requires a great number of bearings, which are grease lubricated. The sealing between the support shaft and the shell is also a problem of some degree.

SUMMARY OF THE INVENTION

A spreader roll according to the invention is composed of at least two partial rolls equipped with a composite shell. The spreader roll comprises two end part rolls, which are connected together directly or via an intermediate part roll in such a way that a gap remains between the end surfaces of the shells of the partial rolls. Each end part roll comprises an end journal, connected to the shell outer end and rotating with the shell, which is supported to fixed frame constructions by means of at least one end bearing. The partial rolls are connected together via an intermediate journal rotating with the shells of the partial rolls. Each intermediate journal is supported to a fixed support beam external to the spreader roll by means of an intermediate bearing.

The roll is thus supported to fixed constructions external to the roll by its end journals and intermediate journals.

Thanks to the intermediate support points, the spreader roll according to the invention can carry high loads, which enables its use also in the press section for spreading the web travelling on a press felt. A part of the loads is received by the intermediate supporting points whereupon the loads subjected to the end supporting points and each shell part are notably lower compared to a roll that is fastened only at the ends.

In the spreader roll according to the invention, circulating oil lubrication can be used also in the intermediate bearings. Oil can be led to the intermediate bearing via a channel provided in the intermediate bearing housing.

No sealing is required in connection with the opposite end surfaces of the partial roll shells, because the intermediate bearing is protected within its intermediate bearing housing. Any impurities entering within the roll from between the intermediate bearing housing and the shell end surfaces of the partial rolls cannot access to the intermediate bearing located within the intermediate bearing housing.

The invention is described below by making reference to the figures of the attached drawings, to the details of which the invention is not, however, intended to be exclusively restricted.

DESCRIPTION OF THE PREFERRED EMBODIMENTS

Figure 1:
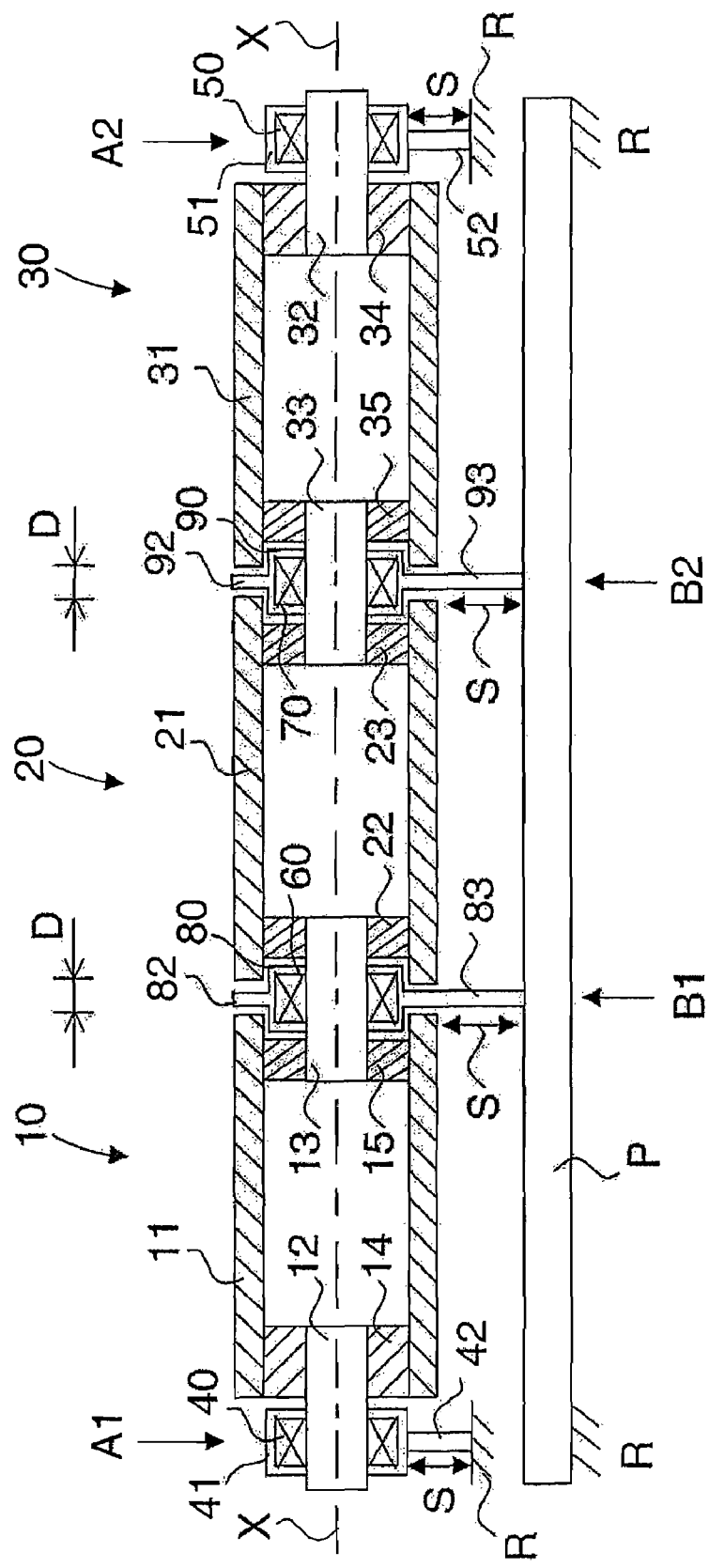
FIG. 1 is a schematic view of the longitudinal vertical cross-section of a roll according to the invention.

FIG. 1 is a schematic view of the longitudinal vertical cross-section of a roll according to the invention. The roll is composed of two end part rolls 10, 30 and an intermediate part roll 20 located between them. Each partial roll 10, 20, 30 has a composite shell 11, 21, 31. The outer end surfaces of the shell 21 of the intermediate part roll 20 are located at a distance D from the inner end surfaces of the shells 11, 31 of the end part rolls 10, 30. An outer end fastening component 14, 34 is fastened to the inner surface of the outer end of the shell 11, 31 of each end part roll 10, 30, and an inner end fastening component 15, 35 is fastened to the inner surface of the inner end of the shell 11, 31. For the intermediate part roll 20, in turn, outer end fastening components 22, 23 are fastened to the inner surface of the outer ends of the shell 21.

An end journal 12, 32 rotating with the shell 11, 31 is fastened to the outer end fastening component 14, 34 located at the outer end of each end part roll 10, 30. The outer surface of each end journal 12, 32 is supported to the rotating inner race of the end bearing 40, 50, while the non-rotating outer race of the end bearing 40, 50 is supported to the end bearing housing 41, 51. Each end bearing housing 41, 51, in turn, is supported to fixed frame constructions R by means of an end support element 42, 52.

The first end part roll 10 and the center part roll 20 are connected together by means of a first intermediate journal 13. The second end part roll 30 and the center roll 20, in turn, are connected together via a second intermediate journal 33. The first intermediate journal 13 is fastened at one end to the inner end fastening component 15 located at the inner end of the shell 11 of the first end part roll 10, and at the other end, to the outer end fastening component 22 located at the outer end of the shell 21 of the intermediate part roll 20. The second intermediate journal 33 is fastened at one end to the inner end fastening component 35 located at the inner end of the shell 31 of the second end part roll 30, and at the other end, to the outer end fastening component 23 located at the outer end of the shell 21 of the intermediate part roll 20.

The first intermediate journal 13 is supported at its center part to the rotating inner race of the first intermediate bearing 60. The outer race of the first intermediate bearing 60 is supported non-rotably to the first intermediate bearing housing 80. The first intermediate bearing housing 80 comprises a first ring-shaped flange section 82, which extends from the gap D between the inner end surface of the roll shell 11 of the first end part roll 10 and the outer end surface of the roll shell 21 of the center part roll 20 to the level of the outer surface of the roll shells 11, 21. The ring-shaped flange section 82 of the first bearing housing 80 comprises a first intermediate support element 83, by means of which the first bearing housing 80 is fastened to a support beam P external to the spreader roll.

The second intermediate journal 32, in turn, is supported at its center part to the rotating inner race of the second intermediate bearing 70. The outer race of the second intermediate bearing 70 is supported non-rotably to the second intermediate bearing housing 90. The second intermediate bearing housing 90 comprises a second ring-shaped flange section 92, which extends from the gap D between the inner end surface of the roll shell 31 of the second end part roll 30 and the outer end surface of the roll shell 21 of the center part roll 20 to the level of the outer surface of the roll shells 31, 21. The ring-shaped flange section 92 of the second bearing housing 90 comprises a second intermediate support element 93, by means of which the second bearing housing 90 is fastened to a fixed support beam P external to the spreader roll.

The rigid support beam P, in turn, is supported to the fixed frame R at its ends.

The journals 12, 13, 33, 32 and the roll shells 11, 21, 31 compose a single rotating unit. The spreader roll is thus supported to the fixed frame R by means of four support points A1, A2, B1, B2. The two outermost support points A1, A2 are located at the roll ends at the end bearings 40, 50 and the two center support points B1, B2 are located at the intermediate bearings 60, 70. The intermediate support elements 83, 93 can be fixed or adjustable. In a situation in which the intermediate support elements 83, 93 are adjustable, each intermediate bearing 60, 70 can be moved in the radial direction S relative to the support beam P. In the corresponding way, the end support elements 42, 52 can be fixed or adjustable. In a situation, in which the end support elements 42, 52 are adjustable, each end bearing 40, 50 can be moved in the radial direction S relative to the frame R.

Figure 2:
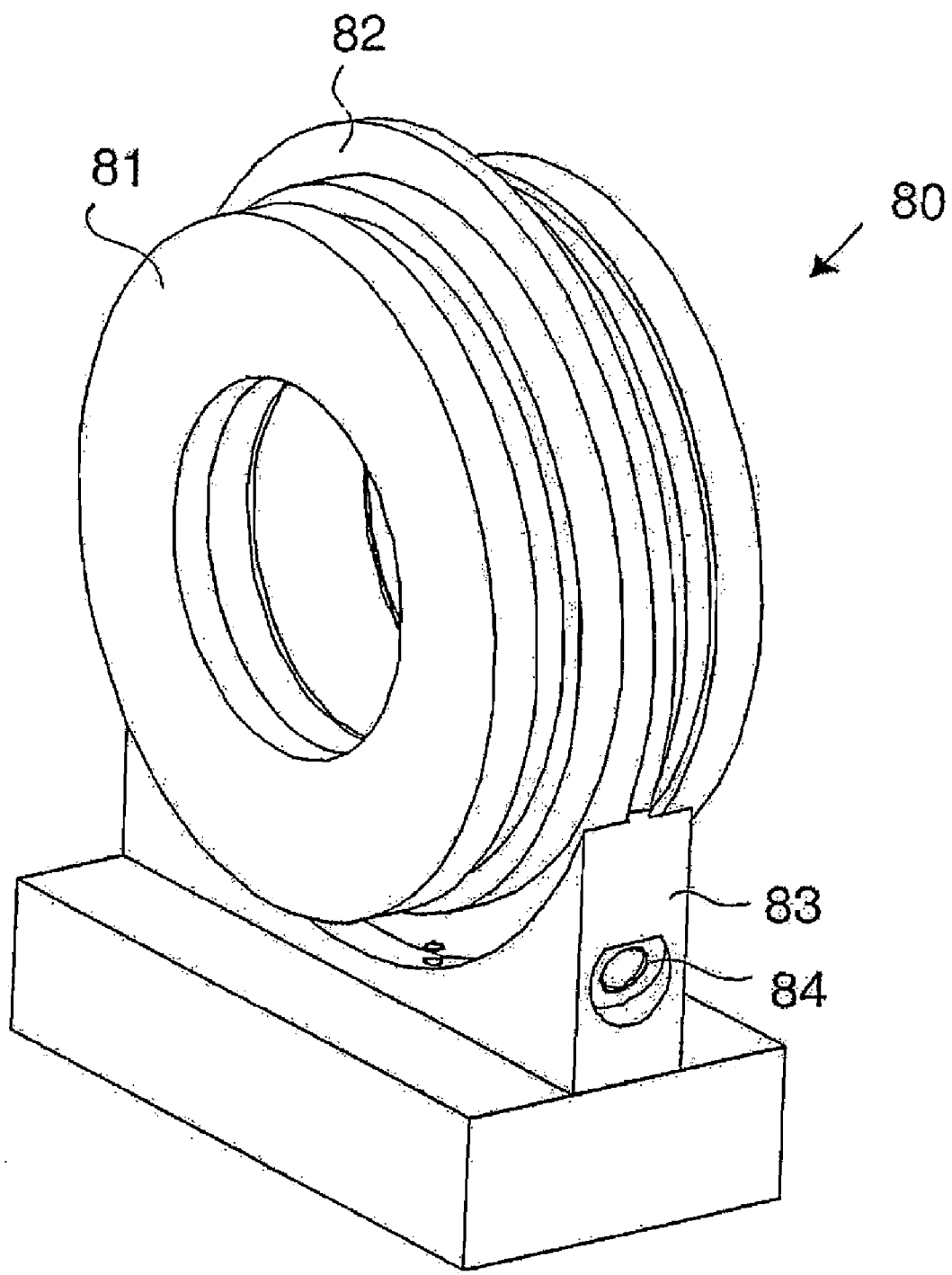
FIG. 2 shows an axonometric view of the intermediate bearing housing.

FIG. 2 shows an axonometric view of the first intermediate bearing housing 80. The intermediate bearing housing 80 comprises a cylindrical section 81 and a flange section 82 located at the center of the cylindrical section 81. The flange section 82 protrudes from the outer surface of the cylindrical section 81 expanding at the bottom part into an intermediate support element 83 by means of which the intermediate bearing housing 80 is fixed to the support beam P. The intermediate bearing 60 is located within the cylindrical section 81 of the intermediate bearing housing 80, whereupon the outer surface of the intermediate journal 13 supports to the rotating inner race of the intermediate bearing 60. The outer race of the intermediate bearing 60, in turn, is supported non-rotably to the intermediate bearing housing 80. The intermediate bearing housing 80 can be equipped with a supply channel 84 for lubrication, along which it is possible to arrange a continuous lubricant supply for the intermediate bearing 60. The first and the second intermediate bearing housings 80, 90 are identical. At the outer ends of the cylindrical section 81 of the intermediate bearing housing 80 there are openable intermediate bearing housing 80 covers providing access to the intermediate bearing 60.

Figure 3:
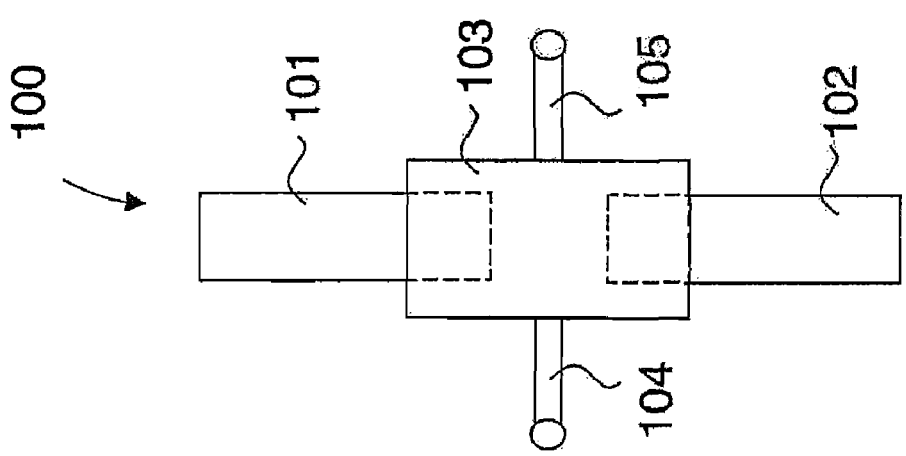
FIG. 3 is a schematic view of one manually adjustable support element.

FIG. 3 show an example of a manually adjustable support element 100, which can be used in connection with the intermediate support elements 83, 93 and the end support elements 42, 52. The support element 100 comprises a first pin 101 provided with a male thread, a second pin 102 provided with a male thread, and a sleeve 103 with a female thread connecting the pins. The sleeve 103 has additionally handles 104, 105 by means of which the sleeve 103 can be turned. The threads of the pins 101, 102 and the sleeve 103 are arranged in such a way that when the sleeve 103 is turned to one direction, the pins 101, 102 turn inside the sleeve 103, and when the sleeve is turned to the opposite direction, the pins turn out of the sleeve 103.

Figure 4:
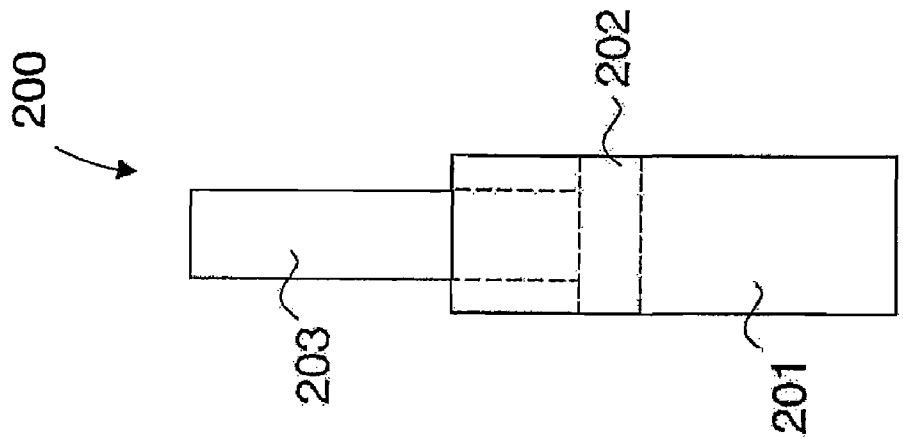
FIG. 4 is a schematic view of one automatically adjustable support element.

FIG. 4 show an example of an automatically adjustable support element 200, which can be used in connection with the intermediate support elements 83, 93 and the end support elements 42, 52. The support element 200 comprises a cylinder 201, a piston 202 adapted to the cylinder, and a piston pin 203 fastened to the piston 202. The piston 202 and thus the piston pin 203 can be moved by leading a pressure medium to either side of the piston 202.

Bending the roll to a curvature can be performed in three ways. In the first alternative, the intermediate bearings 60, 70 are kept in a fixed position by the intermediate support elements 83, 93, while the end bearings 40, 50 are deviated by means of the end support elements 42, 52. By keeping the intermediate bearings 60, 70 in a fixed position and by deviating the end bearings 40, 50 downwards e.g. in FIG. 1, the roll is bent to a curvature in such a way that the roll center is up and the ends are down. The bending moment is shifted from the end journals 12, 32 via the shells 11, 31 of the end part rolls 10, 30 to the intermediate journals 13, 33, from which the moment is further shifted to the shell 21 of the center part roll 20. In the second alternative the end bearings 40, 50 are kept in a fixed position by the end support elements 42, 52, while the intermediate bearings 60, 70 are deviated by means of the intermediate support elements 83, 93. By keeping the end bearings 40, 50 in a fixed position and by deviating the intermediate bearings 60, 70 upwards e.g. in FIG. 1, the roll is bent to a curvature in such a way that the roll center is up and the ends are down. The bending moment is shifted from the intermediate journals 13, 33 to the shell 21 of the intermediate part roll 20 and to the shells 11, 31 of the end part rolls 10, 30. In the third alternative both the end bearings 40, 50 and the intermediate bearings 60, 70 are deviated. By deviating the end bearings 40, 50 downwards e.g. in figure and the intermediate bearings 60, 70 upwards in the figure, the roll is bent to a curvature in such a way that the roll center is up and the ends are down. The bending moment is shifted from the end journals 12, 32 to the shells 11, 31 of the end part rolls 10, 30 and from the intermediate journals 13, 33 to the shell 21 of the intermediate part roll 20 and to the shells 11, 31 of the end part rolls 10, 30.

In the embodiment shown in FIG. 1, the shell 21 of the intermediate part roll 20 is bent to a smooth curvature, while the curvature of the shells 11, 31 of the end part rolls 10, 30 is linearly increasing towards the outer ends of the shells 11, 31 of the end part rolls 10, 30.

The roll shown in FIG. 1 is composed of three partial rolls. The roll has two end part rolls 10, 30 and an intermediate part roll 20 in between. If the roll is relatively short, it can be implemented using only two partial rolls. In this case the intermediate part roll 20 is left out. The end part rolls 10, 30 are then fastened directly together by means of the intermediate journal 13 in a similar way as the first end part roll 10 is fastened to the intermediate part roll 20 in FIG. 1. In a roll composed of two partial rolls 10, 30 we have only three support points, in which case the load received by each support point is greater than in the roll composed of three partial rolls.

The roll shown in FIG. 1 could in principle also comprise more than one intermediate part roll 20. The partial rolls will then be relatively short, in which case bending them to a curvature becomes difficult.

In the situation shown in FIG. 1 the roll curvature is formed in the vertical plane. The roll can obviously also be fastened in such a way that the roll curvature is formed in the horizontal plane or in any arbitrary angle between the vertical and horizontal planes. Fastening of the support beam P and the end bearing housings 41, 51 to the frame R can be arranged in such a way that the angular position of the roll curvature is adjustable.

The outer diameter of the roll shell is advantageously in a range of 150-600 mm, the shell thickness with the cover is advantageously in a range of 8-25 mm, the diameter of the journals is advantageously in a range of 70-150 mm, and the roll length is advantageously in a range of 5-12 m.

Set forth below are the claims defining the inventive idea within which the details of the invention can vary from the above description which is given only as an example.

The invention claimed is:

1. A spreader roll assembly comprising:
    a first partial roll having a composite shell, and having a first coaxial end journal mounted to a first end of the first partial roll for rotation with the first partial roll, and an intermediate coaxial journal mounted to a second end of the first partial roll for rotation with the first partial roll;
    a second partial roll having a composite shell having a second coaxial end journal mounted to a first end of the second partial roll for rotation with the second partial roll, and wherein a second end of the second partial roll is mounted to the intermediate coaxial journal which connects the first partial roll and the second partial roll so that the intermediate coaxial journal is mounted for rotation with the first partial roll and the second partial roll;
    a first construction mounted to a fixed frame;
    a first bearing mounted to the first construction, wherein the first coaxial end journal is mounted for rotation on the first bearing;
    a second construction, mounted to the fixed frame;
    a second bearing mounted to the second construction, wherein the second coaxial end journal is mounted for rotation on the second bearing;
    a third construction mounted to the fixed frame; and
    a third bearing mounted to the third construction, wherein the intermediate coaxial journal is mounted for rotation on the third bearing, and wherein the first partial roll shell and the second partial roll shell are spaced apart axially to define a gap therebetween, and wherein the third construction has portions extending through the gap to a fixed support beam external to the partial rolls which is in turn mounted to the fixed frame.

2. The assembly of claim 1 further comprising:
    a third partial roll having a composite shell and having a first end with a further intermediate journal mounted to the second end of the second partial roll for rotation with the third partial roll, the third partial roll connecting the second partial roll to the first partial roll, and wherein a second end of the third partial roll is mounted to the intermediate journal which connects the third partial roll and the first partial roll so that the intermediate journals are mounted for rotation with the first, second, and third partial rolls;
    a fourth construction mounted to the fixed frame;
    a fourth bearing mounted to the fourth construction, wherein the further intermediate journal is mounted for rotation on the fourth bearing, wherein the second partial roll shell and the third partial roll shell are spaced apart axially to define a further gap therebetween, and wherein the fourth construction has portions extending through the further gap to the fixed support beam external to the partial rolls.

3. The assembly of claim 1, wherein the intermediate bearing is installed in an intermediate bearing housing mounted to the third construction, the bearing housing having a ring-shaped flange section extending into said gap between the first partial roll shell and the second partial roll shell, wherein the portions extending through the gap to the fixed support beam external to the spreader roll form an intermediate support element protruding from the ring-shaped flange section, which is joined to the third construction.

4. The assembly of claim 1,
wherein the first bearing is installed in a first bearing housing which is supported to the first construction by a first adjustable support element;
wherein the second bearing is installed in a second bearing housing which is supported to the second construction by a second adjustable support element; and
wherein the third bearing is installed in a third bearing housing which is supported to the third construction by a third adjustable support element.

5. The assembly of claim 4, wherein the first, second and third adjustable support elements are composed of manually adjustable support elements, each of which comprises:
a first pin having a male thread;
a second pin having a male thread; and
a sleeve with a female thread connecting the first pin and the second pin, said sleeve having turning handles thereon, so that turning the sleeve from the turning handles expands the adjustable support element.

6. The assembly of claim 4, wherein the first, second and third adjustable support elements are composed of automatically adjustable support elements, each of which comprises:
a cylinder;
a piston adapted to the cylinder; and
a piston pin fastened to the piston, so that a pressure medium moves the piston and thus the piston pin, causing the expansion of the adjustable support element.

7. A spreader roll assembly, comprising:
a plurality of linearly arrayed partial rolls, each partial roll having a composite shell with two ends, wherein the composite shells are spaced apart to define gaps between adjacent composite roll shell ends, and wherein each composite shell is joined to one or two adjacent composite shells by an intermediate journal fixedly mounted to adjacent roll shell ends and extending across the defined gap so that all of the plurality of partial rolls are fixedly joined together to rotate together and to form a spreader roll;
a first end journal at a first end of the spreader roll, the first end journal being fixedly mounted to a first partial roll of said plurality of partial rolls, and the first end journal being mounted by a first end bearing to a first fixed frame construction;
a second end journal at a second end of the spreader roll, the second end journal being fixedly mounted to a second partial roll of said plurality of partial rolls, the second end journal being mounted by a second end bearing to a second fixed frame construction;
a fixed support beam external to the spreader roll; and
an intermediate bearing for each intermediate journal, wherein each intermediate journal is supported to the fixed support beam by an intermediate bearing.

8. The assembly of claim 7, wherein each intermediate bearing is installed in an intermediate bearing housing having a ring-shaped flange section extending to said gap between the composite shells, and an intermediate support element which protrudes from the ring-shaped flange section and which is supported to the fixed support beam external to the spreader roll.

9. The assembly of claim 7 wherein the first end bearing and the second end bearing are installed in end bearing housings which are supported to the first and second fixed frame constructions by end support elements.

10. The assembly of claim 9 wherein each end support element is a manually adjustable support element comprising:
an end bearing housing;
a first pin mounted to the end bearing housing, the first pin provided with a male thread;
a second pin provided with a male thread mounted to the first fixed frame construction; and
a sleeve with a female thread threadedly connected to the first pin and the second pin, the sleeve having turning handles, so that turning the sleeve with the turning handles deviates one of said end bearings in a radial direction with respect to the spreader roll.

11. The assembly of claim 8, wherein each intermediate support element is a manually adjustable support element comprising:
a first pin mounted to the intermediate bearing housing, the first pin provided with a male thread;
a second pin provided with a male thread, mounted to the fixed support beam; and
a sleeve with a female thread threadedly connected to the first pin and the second pin, said sleeve having turning handles, so that turning the sleeve with the turning handles deviates one of said each intermediate bearings in a radial direction with respect to the spreader roll.

12. The assembly of claim 9 wherein each end support element is an automatically adjustable support element comprising:
a cylinder;
a piston adapted to the cylinder; and
a piston pin fastened to the piston, the pin being mounted to one of the end bearing housings, wherein a pressure medium can move the piston and thus the piston pin to deviate said one end bearing in a radial direction with respect to the spreader roll.

13. The assembly of claim, 8 wherein each intermediate support element is an automatically adjustable support element comprising:
a cylinder;
a piston adapted to the cylinder; and
a piston pin fastened to the piston, and mounted to an intermediate bearing housing, wherein a pressure medium can move the piston and thus the piston pin to deviate said intermediate bearing in a radial direction with respect to the spreader roll.

14. The assembly of claim 7 wherein the support beam has end portions which are fastened to fixed frame constructions.

15. A assembly comprising at least two partial rolls, each partial roll having a composite shell, the at least two partial rolls comprising two end part rolls which are connected together directly or via an intermediate part roll such that a gap is defined between end surfaces of the roll shells, wherein each end part roll has an end journal connected to an outer end of its roll shell which rotates with said roll shell, said end journal being supported to a fixed frame construction by an end bearing, the partial rolls being connected together by an intermediate journal rotating with the roll shells of the partial rolls, said intermediate journal being supported to a fixed support beam external to the spreader roll by an intermediate bearing fixed to said support beam.

* * * * *